Figure 1:
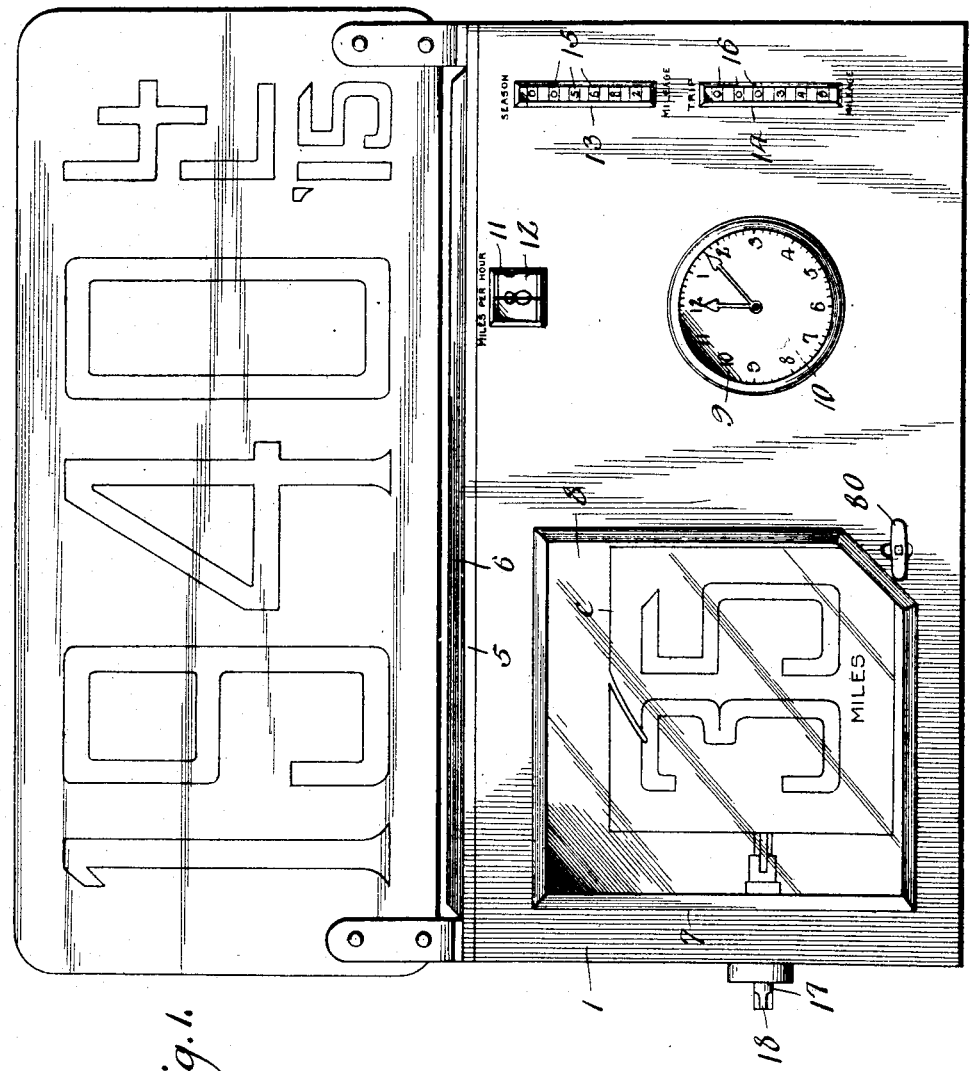

A. J. MOELLER & E. A. ROTTER.
SPEED AND MILEAGE REGISTER AND RECORDER.
APPLICATION FILED NOV. 4, 1915.

1,209,608.

Patented Dec. 19, 1916.
5 SHEETS—SHEET 1.

Witnesses

Inventors
A. J. Moeller and
E. A. Rotter,
By Victor J. Evans
Attorney

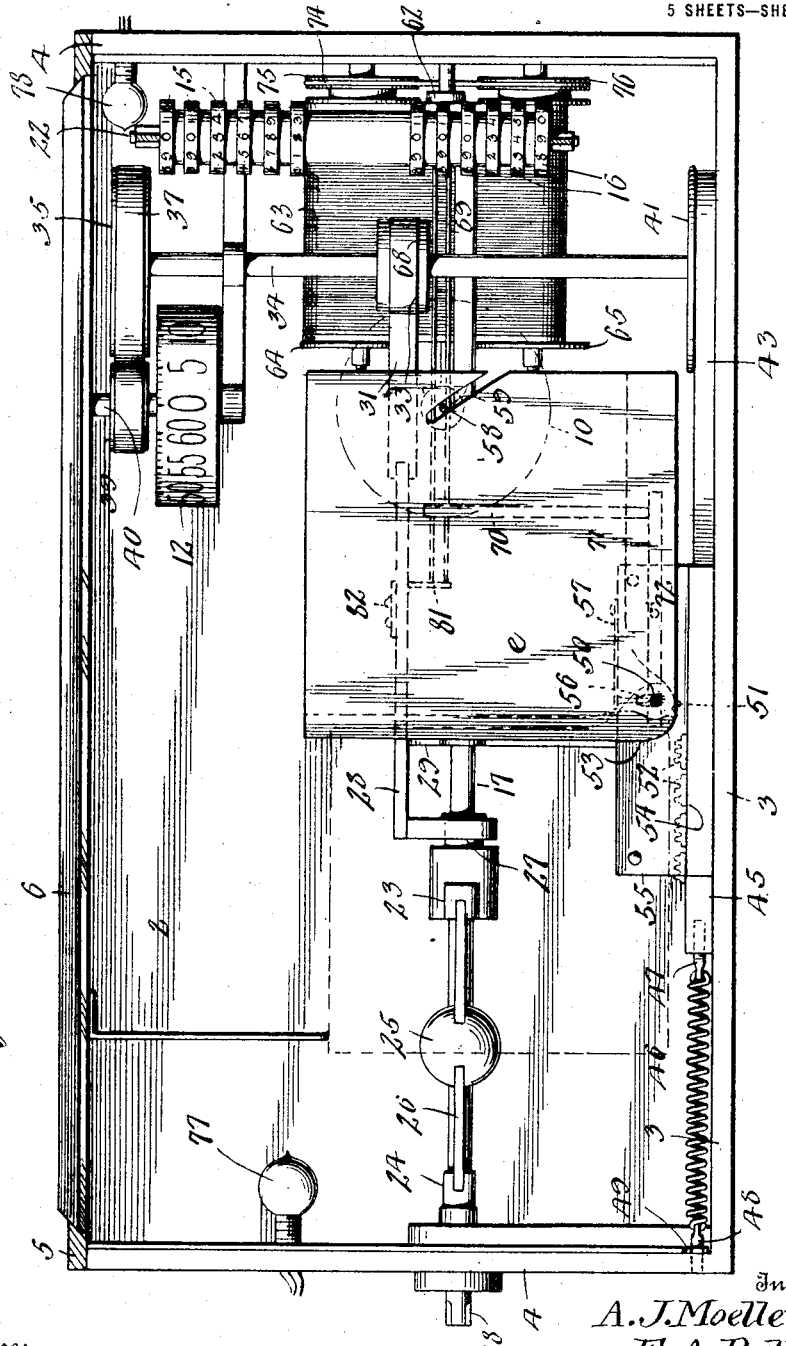

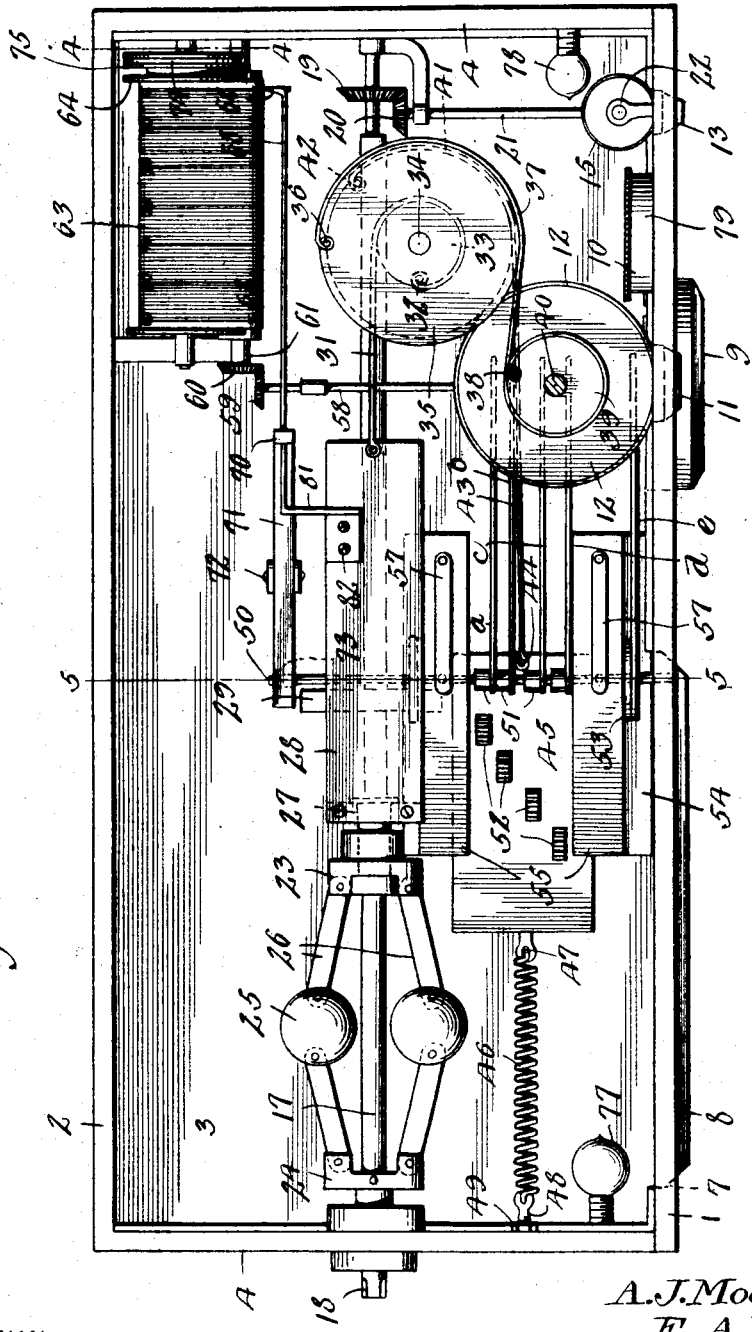

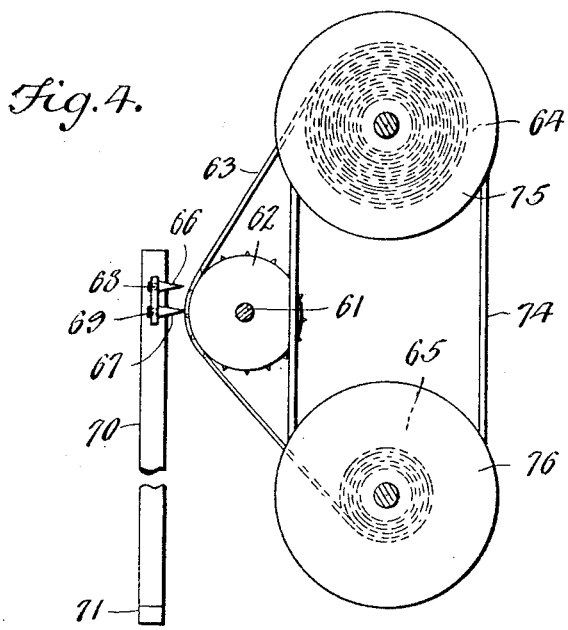
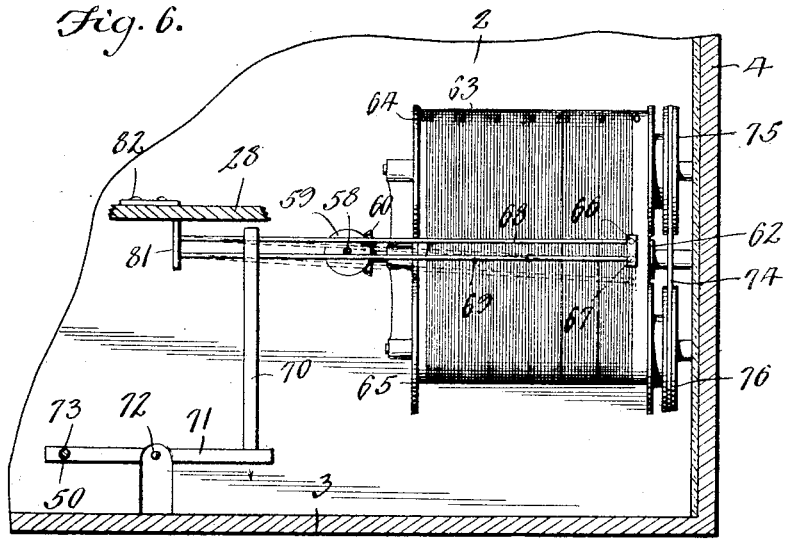

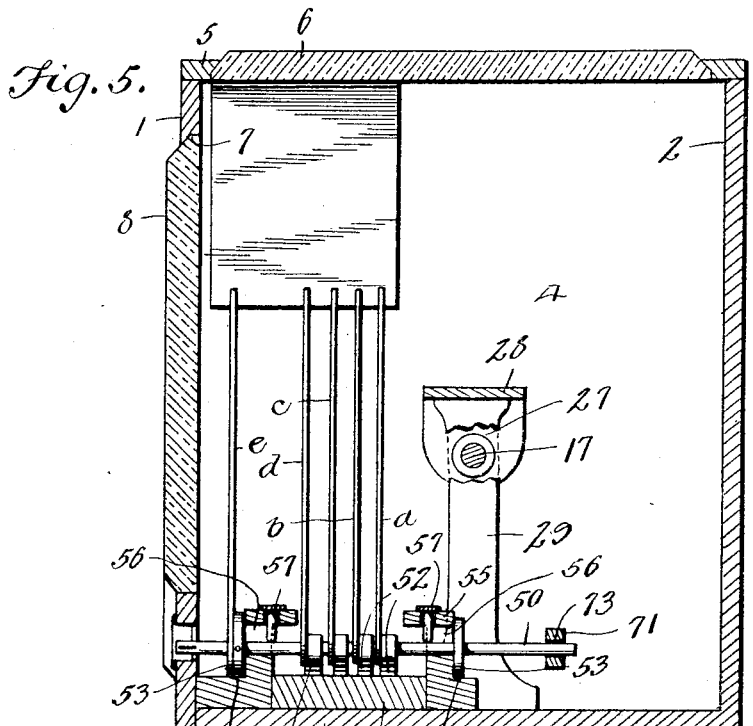
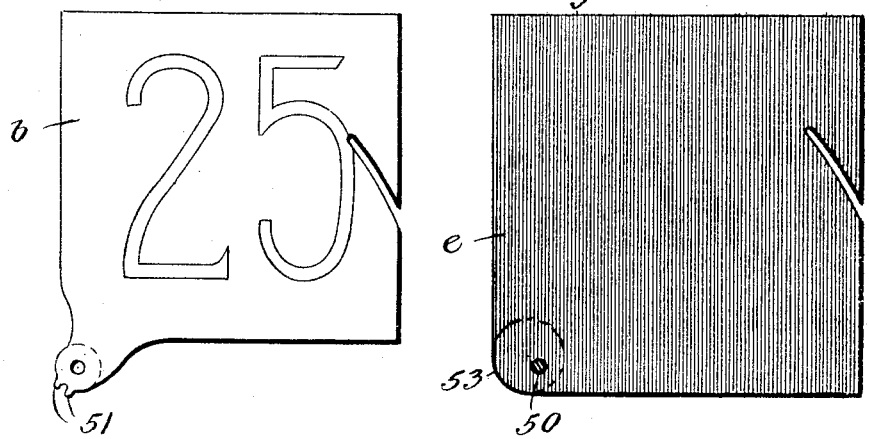

UNITED STATES PATENT OFFICE.

ARTHUR J. MOELLER AND EDWARD A. ROTTER, OF CHICAGO, ILLINOIS.

SPEED AND MILEAGE REGISTER AND RECORDER.

1,209,608.  Specification of Letters Patent.  Patented Dec. 19, 1916.

Application filed November 4, 1915. Serial No. 59,631.

*To all whom it may concern:*

Be it known that we, ARTHUR J. MOELLER and EDWARD A. ROTTER, citizens of the United States, residing at Chicago, in the county of Cook and State of Illinois, have invented new and useful Improvements in Speed and Mileage Registers and Recorders, of which the following is a specification.

This invention relates to speed and mileage registers and recorders, the object in view being to produce a device of the class referred to which is especially designed for use in connection with and adapted to be mounted upon and carried by automobiles, motor trucks and other engine propelled vehicles, the device as a whole embodying novel and reliable means whereby the speed of the vehicle is visually displayed, indicated or registered and at the same time the speed and mileage are recorded on a permanent record sheet for future reference and use.

One of the principal objects of the present invention is to provide means whereby the maximum speed attained by the vehicle is clearly and unmistakably indicated by characters of sufficient size to enable them to be read by traffic policemen, pedestrians and the drivers of other vehicles, the maximum speed being maintained in plain view and the mechanism controlling the last named feature being so mounted and arranged that it cannot be tampered with by a chauffeur or operator.

With the above and other objects in view, the invention consists in the novel construction, combination and arrangement of parts, as herein described, illustrated and claimed.

In the accompanying drawings: Figure 1 is a face view of the register and recorder of this invention showing the license number panel attached thereto. Fig. 2 is a view looking in the same direction but omitting the front wall of the device so as to better illustrate the internal mechanism. Fig. 3 is a plan view thereof with the top plate removed to show the internal mechanism. Fig. 4 is a fragmentary vertical section on the line 4—4 of Fig. 3. Fig. 5 is a vertical transverse section on the line 5—5 of Fig. 3. Fig. 6 is a fragmentary vertical longitudinal section taken just in front of the speed recording mechanism. Fig. 7 is a detail face view of one of the speed indicating panels. Fig. 8 is a similar view of the colored panel, showing its cam in dotted lines.

The combined register and recorder contemplated in this invention comprises a suitable box-like casing comprising the face or front wall 1, back wall 2, bottom 3, ends 4 and top 5, the latter consisting mainly of a rectangular panel-holding frame containing a panel 6 of glass or like material which will enable the internal mechanism within the casing to be readily observed.

The front wall 1 of the casing is formed with an observation opening 7 covered by a transparent panel 8 preferably of glass, behind which the speed indicating plates or flaps are discernible as will hereinafter more clearly appear. The face plate 1 is also provided with a transparent panel 9 behind which is located clock mechanism 10, another glass covered opening 11 behind which operates the odometer wheel 12, and other glass covered apertures 13 and 14 behind which are arranged two sets of mileage registering wheels or members 15 and 16, the members 15 being appropriate to register mileage for the season while the members 16 are employed to register the mileage for each trip.

Motion is imparted to the various mechanical and operating elements of the mechanism to be described through the medium of a driving shaft 17 one end of which projects through an end wall of the casing where it is formed as shown at 18 to enable a flexible driving shaft (not shown) to be coupled thereto, the said flexible shaft being similar to that used in connection with so-called speedometers now in common use on automobiles. The driving shaft 17 is mounted in suitable bearings within the casing and extends nearly the entire length thereof, being connected by gears 19 and 20 to a shaft 21 which is in turn geared to the shaft 11 which controls and operates the registering wheels 15 and 16 just hereinabove referred to.

Mounted loosely on the shaft 17 is a slide collar 23 which is automatically shifted longitudinally of the shaft 17 by governor mechanism embodying a collar 24 fastened to the shaft 17, governor weights 25 and governor links 26 pivotally connected to the weights 25 and to the loose collar 23 and the fixed collar 24 as clearly indicated in Fig. 3.

The slidable collar 23 has connected thereto by a swivel joint at 21 a slide 28 which rests upon and slides in contact with a support or upright 29 beneath the same. Attached to one end of the slide 28 is a flexible connection preferably in the form of a steel tape 31 the other extremity of which is attached at 32 to a pulley 33 fast on a shaft 34. Fast on the same shaft 34 is a large pulley 35 having fastened thereto at 36 one end of a steel tape 37 the other end of which is attached at 38 to a pulley 39 on the shaft 40 of the odometer wheel 12 above referred to, said odometer wheel being revolved in the opposite direction by means of a coiled spring or its equivalent. Another pulley 41 fast on the shaft 34 has attached thereto at 42 a steel tape 43 the opposite extremity of which is attached at 44 to a sliding rack bar or plate 45. This plate 45 is moved in one direction by means of a contractile spring 46 having one end attached at 47 to said plate and the other end attached to a threaded stem 48 capable of being adjusted as to its length by means of a nut 49 whereby the spring 46 may be accurately tensioned. It will be observed that the spring 46 acts in opposition to the governor mechanism above described keeping the steel tapes 41 and 42 taut thereby adding materially to the accuracy of the mechanism.

On a horizontally extending shaft 50 there is mounted a series of speed indicating flaps, plates or panels a, b, c and d and also a colored flap or plate e, the last named flap or plate being preferably colored red for a purpose which will hereinafter be explained and being arranged nearest the glass panel 8. The other panels, plates or flaps a, b, c and d have numbers printed thereon as indicated in Figs. 1 and 2 representing miles per hour. Each of the last named flaps or plates is provided with a toothed segment 51, shown as consisting of only two teeth while the sliding rack plate 45 is provided with several rack faces 52 each also having a small number of teeth, two being shown, the rack faces 52 being respectively in line with the toothed sectors 51 of the respective flaps a, b, c and d and being offset in relation to each other as clearly shown in Fig. 3. The flaps or plates a, b, c and d are loosely mounted on the shaft 50 so as to turn through an arc of approximately ninety degrees as indicated in Fig. 2 and it will now be understood that as the plate 45 slides to the right in Fig. 3, the rack faces 52 will successively engage the respective sectors 51 with the result that the rear flap a containing figures representing the lowest miles per hour will be turned from its concealed position behind the face wall 1 of the casing to an exposed position behind the transparent panel 8, followed by the similar movement of the remaining flaps b, c and d each containing numbers successively higher.

A cam 53 bearing a fixed relation to the colored flap e embraces the shaft 50 and works against a supporting surface 54. When the panel e is turned through an arc of ninety degrees in the same manner as the other panels or flaps a, b, c and d, the shaft 50 which is journaled in bearing plates 55 is caused to ride upwardly in substantially vertical slots 56 in said bearing plates thereby elevating the sector teeth 51 so that they will not coöperate with the rack faces of the plate 45 as the latter slides back and forth. The object of this mechanism is to cut out the working of the flaps a, b, c and d when the vehicle has passed beyond the city limits or the zone in which the operator is limited to a comparatively slow speed. Springs 57 yieldingly hold the shaft 50 depressed while allowing the same to be moved upward by the cam device just hereinabove described, the springs 57 being fastened to the top of the bearing plates or members 55.

An arbor 58 of the clock mechanism 10 is connected by gears 59 and 60 to a shaft 61 having fast thereon a toothed or barbed feeding wheel 62 engaging a record sheet or web 63 wound upon a delivery roller 64 and adapted to be wound upon a receiving roller 65. The shafts of the rollers 64 and 65 are mounted in bearings within the casing as is also the shaft 61, the roller 65 being preferably of the spring type so that it will wind the record web 63 thereon as fast as it is fed thereto by the barbed or toothed wheel 62. The web 63 as indicated in Figs. 2 and 3 is ruled and numbered to represent miles per hour and a record is traced thereon by means either of a pair of pencils or markers 66 and 67 carried respectively by holders 68 and 69 shown in the form of wires or rods which extend in substantially parallel relation to the face of the web 62, the said holders being slidable through an upright guide 70 extending upwardly from a lever 71 which is pivotally mounted on a horizontal axis at 72 and is formed with an opening at 72 to receive the shaft 50. The markers 66 and 67 preferably consist of red and blue pens or pencils, the blue pencil being utilized preferably for operating in cities or congested districts where the traffic regulations call for a low mileage per hour and the red pencil being preferably used for work in outlying or country districts where greater speed is permissible under the traffic laws. When the panel or flap e, which as above stated is preferably red, is thrown into view behind the transparent panel 8, the red marker is thrown in position to trace a line upon the record sheet or web 63 and when said red panel e is thrown away from the window 8, the blue pencil is thrown into operative relation to the record sheet or web 62. To insure the operation of the rollers 64 and 65, a belt 74 is passed around pulleys 75 and 76 at the ends of said rollers as shown in Fig. 4. Electric lamps 77 and 78 are mounted within the casing so as to illuminate the interior thereof and enable the numbers and mechanism generally to be clearly observed. 79 designates an ordinary eight day clock mechanism driving spring used in conjunction with the clock 10. The cam 53 is turned from the outside of the case by means of a handle 80 as shown in Fig. 1 for the purpose of setting the mechanism for city or country use. The pencil holding rods 68 and 69 are slidable through the upright guide 60 and are attached to an arm 81 in turn fastened at 82 to the slide 28. In this way the markers are drawn across the face of the record sheet or web in accordance with the speed at which the vehicle is traveling.

The device hereinabove described keeps a continuous record of the speed at which the car is driven and shows in large numerals, in plain view to the general public, the maximum speed which the car has attained. The device is intended to be mounted at any suitable place on the machine preferably at the front of the machine and to one side of the driver or at the side of the car and the driving shaft of the device is intended to be driven by a flexible shaft as above noted either from the front wheel or any other rotating member of the vehicle. The registering devices are visible through the glass panels, the movable panels are preferably composed of transparent plates which have represented thereon a number corresponding with a certain speed in miles per hour, one of the plates preferably indicating the number of miles allowed under the local traffic regulations, and the foremost panels being preferably colored red so as to conceal the other numbers when traveling outside of the city limits in which the speed traffic regulations prevail. When a speed indicating panel is moved from its concealed to its exposed position, it remains there and cannot be returned to its concealed position without unlocking the front panel of the casing which is in the form of a door. The key to this door may be retained by the owner of the car or by an officer of the police force so that the actual operator or chauffeur of the car may not tamper with the internal mechanism. In addition to this, a continuous record covering, if desired, a period of several months or more, is made upon a record sheet which is operated continuously by clock mechanism and is also in plain view. The speed indicating panels may be put out of commission at any time after the vehicle arrives beyond the city limits and is traveling in the country, this feature of the invention being controlled by hand and if used at night, one of the electric illuminating lamps within the casing may embody a red globe which will be thrown into use when the use of the speed indicating panels is eliminated. At the same time the markers are shifted so that the red marker will be used, for example, in the open country and the blue pencil within the city limits. This is done to enable the driver to attain a high speed in the country without getting into trouble with the police force upon return within the city limits. Trip and season mileage registers are also operated and controlled by the same mechanism. The interior of the casing is preferably lined with mirrors for the purpose of reflecting the light therein and illuminating the panels, record sheet and other parts of the mechanism and apparatus. It will also be understood that changes may be made in the form, proportion and minor details of construction without departing from the spirit or sacrificing any of the advantages of the invention.

Having thus described our invention, we claim:—

1. In mechanism of the character specified, the combination of a variable speed driving shaft, a governor carried by said shaft and embodying a member slidable longitudinally of said shaft, a slidable rack plate, motion-transmitting means connecting said slidable member and rack plate, tensioning means for said rack plate, and a series of speed-indicating panels mounted for independent movement from a concealed to an exposed position and having means to be engaged by said rack plate whereby said panels are successively moved.

2. In mechanism of the character specified, the combination of a variable speed driving shaft, a governor carried by said shaft and embodying a member slidable longitudinally of said shaft, a slidable rack plate, motion-transmitting means connecting said slidable member and rack plate, tensioning means for said rack plate, a series of speed-indicating panels mounted for independent movement from a concealed to an exposed position and having means to be engaged by said rack plate whereby said panels are successively moved, and means for adjusting the tension on said rack plate.

3. In mechanism of the character specified, the combination of a variable speed driving shaft, a governor carried by said shaft and embodying a member slidable longitudinally of said shaft, a slidable rack plate, motion transmitting means connecting said slidable member and rack plate, tensioning means for said rack plate, a series of speed-indicating panels mounted for independent movement from a concealed to an exposed position and having means to be engaged by said rack plate whereby said panels are successively moved, and an odometer geared to and operated by said driving shaft.

4. In mechanism of the character specified, the combination of a variable speed driving shaft, a governor carried by said shaft and embodying a member slidable longitudinally of said shaft, a slidable rack plate, motion-transmitting means connecting said slidable member and rack plate, tensioning means for said rack plate, a series of speed-indicating panels mounted for independent movement to be engaged by said rack plate whereby said panels are successively moved, and means for eliminating and restoring the coöperative relation between said rack plate and movable indicating panels.

5. In mechanism of the character specified, the combination of a variable speed driving shaft, a governor carried by said shaft and embodying a member slidable longitudinally of said shaft, a slidable rack plate, motion-transmitting means connecting said slidable member and rack plate, and including a pulley, a flexible connection between said pulley and slidable governor member, a second pulley, and a second flexible connection between the second pulley and the rack plate, tensioning means for said rack plate, and a series of speed-indicating panels mounted for independent movement from a concealed to an exposed position and having means to be engaged by said rack plate whereby said panels are successively moved.

6. In mechanism of the character specified, the combination of a variable speed driving shaft, a governor carried by said shaft and embodying a member slidable longitudinally of said shaft, a slidable rack plate, motion-transmitting means connecting said slidable member and rack plate and including a pulley, a flexible connection between said pulley and slidable governor member, a second pulley rotatable with the first named pulley, a speed indicating wheel, a second flexible connection between the second pulley and said wheel, tensioning means for said rack plate, and a series of speed-indicating panels mounted for independent movement from a concealed to an exposed position and having means to be engaged by said rack plate whereby said panels are successively moved.

In testimony whereof we affix our signatures in presence of two witnesses.

ARTHUR J. MOELLER.
EDWARD A. ROTTER.

Witnesses:
HENRY J. W. MOELLER,
RUDOLPH W. BAUSCH.

Copies of this patent may be obtained for five cents each, by addressing the "Commissioner of Patents, Washington, D. C."